INVENTORS
THOMAS J. HARRIS
BANKIM R. SHAH

Sughrue, Rothwell, Mion, Zinn & Macpeak
ATTORNEYS

INVENTORS
THOMAS J. HARRIS
BANKIM R. SHAH

Sughrue, Rothwell, Mion, Zinn & Macpeak
ATTORNEYS

United States Patent Office 3,354,451

Patented Nov. 21, 1967

3,354,451

HIGH SPEED OPTICAL PARALLEL-TO-SERIAL AND SERIAL-TO-PARALLEL CONVERSION OF BINARY INFORMATION

Thomas J. Harris and Bankim R. Shah, Poughkeepsie, N.Y., assignors to International Business Machines Corporation, New York, N.Y., a corporation of New York Filed June 30, 1964, Ser. No. 379,171
23 Claims. (Cl. 340—347)

ABSTRACT OF THE DISCLOSURE

A high speed optical parallel-to-serial and serial-to-parallel converter. For parallel-to-serial conversion, each bit controls the energization of a light source, all of the light sources being directed to a unit which contains a pair of coordinately arranged polarizers and an electro-optical material between the polarizers. Light from each source strikes the electro-optical material at a different region and passes through the second polarizer to a detector only if the electro-optic material is energized by a voltage pulse in the region through which the light is passing. The electro-optical material has transparent electrodes on each side thereof and acts as a transmission line to a voltage pulse applied at one end thereof. The pulse travels down the transmission line sequentially energizing the individual regions of the material. As each new region is energized, the light from the associated source is then allowed to pass through the second polarizer to the detector, the entire process causing serialization of the parallel input.

Conversion back to parallel form occurs through the use of similar apparatus. In this case, each light pulse floods the entire transmission line when the pulse appears. However, since the transmission line will be energized in only a single region, the light will energize only the single detector out of a plurality of detectors. Each detector is located to receive light passing through a separate region of the transmission line.

The invention relates to high-speed data transferring systems. More specifically, the invention relates to a system for transferring parallel data from one location to a second location by converting the parallel data into serial form at the first location, sending the serial data to the second location by means of a light source, and reconverting the serial information to parallel form at the second location.

In most computer and data processing operations, there is a necessity for transferring large blocks of information from one location to another location. A block of information may be transferred from one location to a second location by a series of parallel cables, one cable for each data bit. This method has the capabilities of high-speed transfer, but is costly and requires a multiplicity of cables.

Another method for transferring large blocks of information from one location to a second location is to convert the data at the first location to serial form, transfer the serial infrmation over a single cable, and then reconvert the information to parallel form at the second location. Heretofore, this method has suffered from the disadvantage that high-speed transfer could not be obtained.

The invention uses a single light beam to perform the information transfer function. However, transferring information over a single light beam necessitates a rapid parallel-to-series conversion at the first location and a rapid series-to-parallel conversion at the second location.

Heretofore, some of the fastest known parallel-to-serial converters operate at 20 nanoseconds per bit. Some of the newer family of computer circuits have memories which require serial transfer rates greater than 20 nanoseconds per bit. To satisfy the conversion speed, the invention includes a novel optical parallel-to-serial converter at the first location and a novel optical serial-to-parallel converter at the second location.

It is an object of the invention to provide a high-speed optical data transfer system.

It is a further object of the invention to transfer parallel data from a first location to a second location by converting the information at the first location into serial form and sending the serial information to the second location by means of a light beam.

It is another object of the invention to provide a novel high-speed electro-optical parallel-to-serial converter.

It is another object of the invention to provide a high-speed electro-optical serial-to-parallel converter.

The parallel word to be transferred is stored in a register. The register actuates a plurality of light emitting diodes with the light from each diode focused through a polarized onto an electro-optical transmission line. The polarized light passes through the electro-optical transmission line but is blocked by an analyzer which is crossed with respect to the polarized. By applying a high voltage pulse to the electro-optical transmission line, the transmission line becomes active and rotates the polarization of light passing therethrough, so as to enable the light to pass through the analyzer. The light which passes through the analyzer is focused onto a photodetector and converted into electrical impulses. The impulses are in serial form and activate a lasing diode which sends the information to the second location.

At the second location, the information is picked up by a photodetector and transferred to a further light emitting diode. This light emitting diode is responsive to the serial impulses, and the light rays from the diode are focused through a polarized onto the entire face of an electro-optical transmission line. The polarized light which is focused onto the face of the electro-optical transmission line passes through the transmission line but is blocked by an analyzer which is crossed with respect to the polarizer. Again, by applying a high voltage impulse to the electro-optical transmission line at the second location, light on certain segments of the face of the electro-optical transmission line will be rotated in polarization so as to enable the light to pass through the analyzer. Light passing through the analyzer is picked up by one of a plurality of photodetectors. The photodetectors are connected to an output register which stores the information in parallel form.

A better understanding of the invention and further objects thereof may be had from the detailed description thereof that follows with reference to the drawings, wherein.

Figure 1:
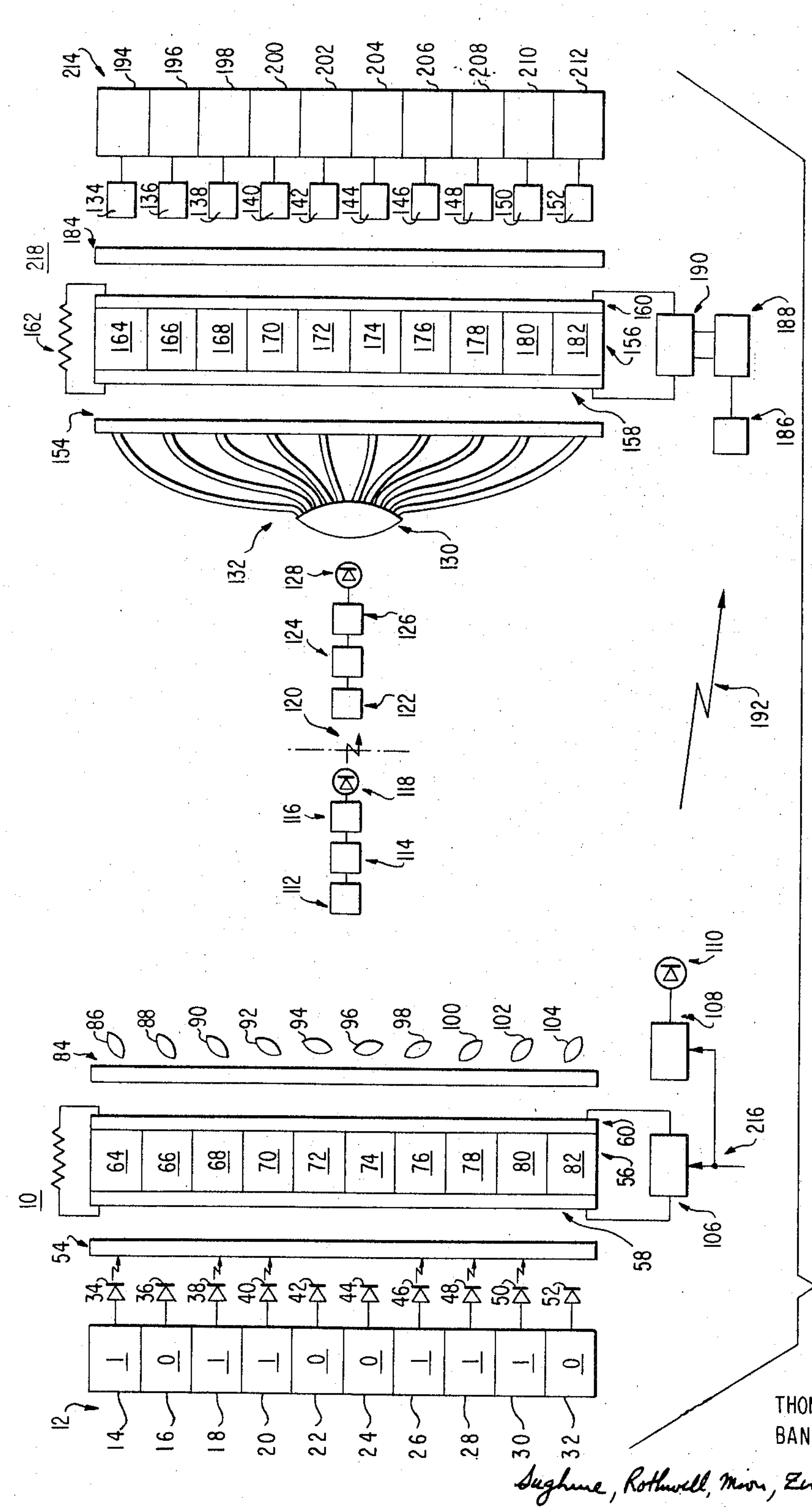
FIGURE 1 is a block diagram of a preferred embodiment of the high-speed data transferring system of the invention.

In FIGURE 1, the numeral 10 generally indicates a first location for converting parallel information to serial form and transmitting the serial information to a second location. Number 218 indicates a second location for receiving the transmitted serial information and converting it to parallel form.

A word to be transmitted is stored in register 12 having stages 14 through 32. For purposes of explanation only, the word is considered to be the binary 1011001110. A plurality of diodes 34 through 52 are connected respectively to stages 14 through 32 of register 12. These diodes may be lasing or light emitting diodes of the gallium arsenide type as is well known in the art. The light from the diodes is focused onto an electro-optical transmission line 56. Transmission line 56 may be of any electro-optical material capable of rotating the plane of polarization of light passing therethrough as is well known in the art. Transmission line 56 is a single continuous crystal, however, for purposes of explanation, the crystal is divided into ten parts, 64 through 82. A polarizer 54 is positioned between the plurality of light emitting diodes and the electro-optical transmission line 56. Attached to transmission line 56 are electrodes 58 and 60. Electrodes 58 and 60 are semitransparent conductive electrodes.

An input pulse is applied at 216 to trigger high voltage generator 106. The output from the high voltage pulse generator 106 is applied to conducting plates 58 and 60. Transmission line 56 is terminated by a resistor 62 which is equal to the characteristic impedance of the transmission line. An optical analyzer 84 whose transmission path is crossed with respect to polarizer 54 is positioned to receive light transmitted through transmission line 56. A series of focusing lenses 86 through 104 focus light onto photodetector 112. Photodetector 112 may be a high-speed semiconductor photodiode. The output from photodetector 112 is applied to a lasing diode 118 through an amplifier 114 and an impedance matching network 116.

The triggering input at 216 also triggers a second voltage pulse generator 108 which in turn pulses a second lasing diode 110. By way of example, diodes 110 and 118 may be gallium arsenide lasing diodes.

Lasing diode 118 transmits the information to the second location as indicated by arrow 120, and lasing diode 110 transmits a synchronizing signal to the second location as indicated by arrow 192.

At second location 218, the information is received by a photodetector 122 and applied to a further light emitting diode 128 by means of an impedance matching network 124 and an amplifier 126. Photodetector 122 may be a high-speed semiconductor photodiode.

The light emitted from diode 128 in accordance with the serial information is focused by lens 130 or conducted by optical fibers 132 through polarizer 154 and electro-optical transmission line 156 onto analyzer 184. The transmission path of optical analyzer 184 is crossed with respect to the transmission path of polarizer 154 and thus no light will pass through analyzer 184 unless the polarization is rotated by electro-optical transmission line 156.

Electro-optical transmission line 156 may be of any type of material, well known in the art, which is operable when activated electrically to rotate the plane of polarization of light passing therethrough. Transmission line 156 is a single continuous crystal, but is divided into segments 164 through 182 for purposes of explanation only. Semitransparent electrodes 158 and 160 are attached to electro-optical transmission line 156. The transmission line 156 is terminated by a resistor 162 which is equal to the characteristic impedance of the transmission line.

The synchronizing signal transmitted from lasing diode 110 at the first location is received at the second location by a photodetector 186. Photodetector 186 is connected to a delay network 188 which is in turn connected to a high voltage pulse source 190. The output from high voltage source 190 is applied to conducting electrodes 158 and 160.

A plurality of photodetectors 134 through 152, which may be high-speed semiconductor photodiodes, are positioned to receive light passing through certain segments of the electro-optical transmission line 156. A register 214 comprises stages 194 through 212 which are connected respectively to photodetectors 134 through 152.

In operation of FIGURE 1, a block of information to be transferred from one location 10 to a second location 218 is stored in register 12. By way of example, the information to be transferred is binary word 1011001110. Stages 14, 18, 20, 26, 28, and 30 contain binary 1's. Each stage containing a binary 1 energizes its associated light emitting diode to transmit light. Thus, diodes 34, 38, 40, 46, 48, and 50 will be energized to transmit light towards polarizer 54. The light from the light emitting diodes which is passed through polarizer 54 is plane polarized in one direction. The particular direction of the plane of polarization of the light is not important, so long as the plane of polarization is perpendicular to the transmission path of analyzer 84. In other words, light polarized by polarizer 54 will be blocked by analyzer 84 unless the polarization is rotated. When no pulse is applied to electro-optical transmission line 56, the light from polarizer 54 passes through electro-optical transmission line 56 unaffected and is blocked by analyzer 84.

Electro-optical transmission line 56 is effective to rotate the plane of polarization of light passing therethrough when an electrical field is impressed across plates 58 and 60 of electro-optical transmission line 56. In order to impress an electrical field across electro-optical transmission line 56, a high voltage pulse source 106 supplies a short high voltage pulse to conducting plates 58 and 60. The pulse applied to plates 58 and 60 takes a finite amount of time to travel through the transmission line to terminating resistor 62. Terminating resistor 62 is equal to the characteristic impedance of the transmission line 56 in order to prevent reflection. As the pulse from high voltage source 106 begins its travel through transmission line 56, section 82 of transmission line 56 first becomes active, i.e., an electric field is impressed across section 82. Since stage 32 of register 12 contains a binary zero, light emitting diode 52 will not be energized, and thus no light will be impressed onto section 82 of electro-optical transmission line 56. As the high voltage pulse travels through transmission line 56, section 80 becomes active and section 82 is again inactive, i.e., the electric field caused by the pulse is impressed across section 80. Since stage 30 of register 12 contains a binary 1, diode 50 emits light through polarizer 54 and through section 80 of electro-optical transmission line 56 onto analyzer 84. Since section 80 is now active, the plane of polarization of the light passing therethrough will be rotated so as to enable the light to pass through analyzer 84 and be focused onto photodetector 112 by lens 102. Photodetector 112 detects the light impulse and converts it to an electrical impulse which is amplified by amplifier 114 and passed through impedance matching network 116 to pulse the lasing diode 118.

As the pulse from high voltage pulse source 106 continues its travel, section 78 of electro-optical transmission line 56 becomes active and section 80 again becomes inactive. Since stage 28 of register 12 contains a binary 1, light emitting diode 48 emits light through polarizer 54 and through section 78 of electro-optical transmission line 56 onto analyzer 84. As section 78 is now active, it rotates the plane of polarization of light passing therethrough so as to enable the light to pass through analyzer 84 and be focused onto photodetector 112 by lens 100. Photodetector 112 forms a second pulse caused by the light passing through section 78 of electro-optical transmission line 56, and passes that pulse through amplifier 114, impedance matching network 116 to pulse the lasing diode 118.

Figure 2:
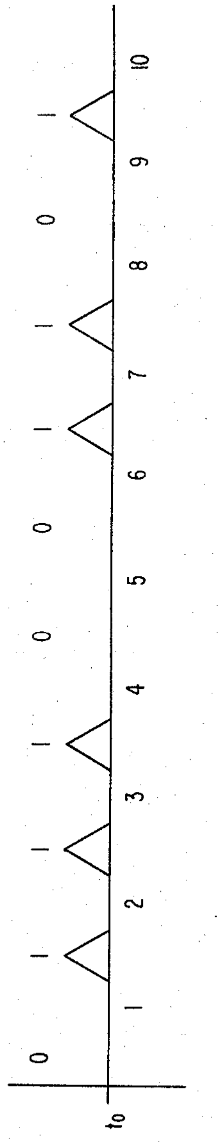
FIGURE 2 is a graph of the wave form transmitted by the lasing diode from the first location to the second location.

It can be seen, that as each section of electro-optical transmission line 56 becomes active to rotate the polarization of light passing therethrough, a pulse will be impressed onto photodetector 112 if the stage of register 12 associated with the particular active section of electro-optical transmission line 56 contains a binary 1, and no pulse, or a space, will be impressed upon photodetector 112 if the associated stage of register 12 for the particular active section of electro-optical transmission line 56 contains a binary zero. Thus, the information transmitted by lasing diode 118 is a series of pulses and spaces representing the binary word stored in register 12. The pulses transmitted by lasing diode 118 are shown in FIGURE 2.

The information transmitted by lasing diode 118 is detected at the second location 218 by photodetector 122. The serial information detected by photodetector 122 passes through impedance matching network 124 and amplifier 126 to pulse diode 128 in accordance with the information. By way of example, the data transferred is a binary word having ten digital positions. Each digital position has a value of one or zero. On represents the presence of a pulse and zero represents the absence of a pulse. Each binary 1 detected will pulse light emitting diode 128. The light from diode 128 is focused by lens 130 or conducted by optical fibers 132 onto polarizer 154. The light is plane polarized by polarizer 154 and illuminates the entire face of electro-optical transmission line 156. The light passes through electro-optical transmission line 156 and is blocked by analyzer 184 except when sections of electro-optical transmission line 156 are active to rotate the polarization of light passing therethrough.

High voltage pulse generator 190 is synchronized with high voltage pulse generator 106, by means to be explained hereafter, to transmit a short high voltage pulse through transmission line 156. The first digital position of the serial information transmitted by lasing diode 118 to the second location contains a binary zero. Since the first digital position contains a binary zero, no light will be emitted by diode 128 and thus no light will pass through polarizer 154, transmission line 156, and analyzer 184 to be detected by photodetector 152. As section 180 of electro-optical transmission line 156 becomes active, the second digital position of the serial information activates diode 128. As the second digital position contains a binary 1, or a pulse, diode 128 will transmit light through polarizer 154 to illuminate the entire face of electro-optical transmission line 156. Since electrodes 158 and 160 and electro-optical transmission line 156 are semi-transparent, the light due to the binary 1 which is focused on the face of the electro-optical transmission line 156 will pass through the transmission line to analyzer 184. However, only the light passing through section 180 of electro-optical transmission line 156 will have its plane of polarization rotated and thus only the light passing through that segment is able to pass through analyzer 184 and impinge on photodetector 150. Photodetector 150 detects the impinging light beam and causes stage 210 of register 214 to register a binary 1.

When the third digital position arrives at the second location and activates diode 128, section 178 of electro-optical transmission line 156 will be active. Since the third digital position contains a binary 1, or a pulse, light from diode 128 will pass through polarizer 154 to illuminate the entire face of electro-optical transmission line 156. However, since only section 178 is now active, only the light passing therethrough will have its polarization rotated and thus be able to pass through anlyzer 184 and impinge on photodetector 148. Photodetector 148 detects the impinging light and causes stage 208 of register 214 to register a binary 1.

Thus, it can be seen, that the entire serial information detected by photodetector 122 will be converted into parallel form and stored in register 214.

For synchronization of the electro-optical transmission lines at the first and second location, there is provided a pulse source 108 adapted to be triggered by an input pulse at 216. Pulse source 108 pulses lasing diode 110 which sends the synchronization pulse to photodetector 186 as indicated by arrow 192. Photodetector 186 converts the light impulse into an electrical impulse and applies it through delay network 188 to trigger high voltage source 190. Delay network 188 has a sufficient delay to compensate for the delay caused by amplifiers 114 and 126 and impedance matching networks 116 and 124.

It should be noted that photodetector 122, impedance matching network 124, amplifier 126 and light emitting diode 128 could be eliminated without affecting the operability of the system shown in FIGURE 1. If these elements were eliminated, light from diode 118 would be focused directly onto transmission line 156 through lens 130, optical fibers 132 and polarizer 154.

Figure 3:
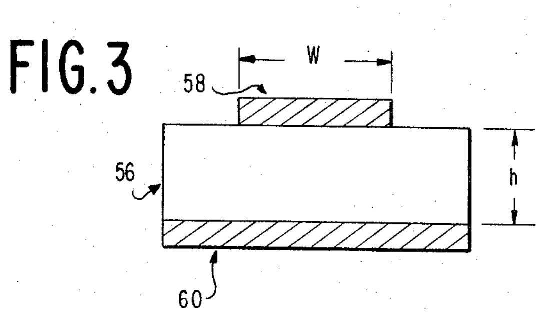
FIGURE 3 is an end view of the electro-optical transmission line and the conducting plates thereon.

In FIGURE 3, there is shown an end view of electro-optical transmission line 56. It is to be understood that electro-optical transmission line 156 which is at the second location is the same as electro-optical transmission line 56.

In FIGURE 3, there is shown the transmission line 56 having electrodes 58 and 60. Electrode 58 has a width $w$ and transmission line 56 has a thickness $h$. FIGURE 3 is useful in explaining, by way of example only, the speed at which the parallel-to-serial or serial-to-parallel conversion takes place.

A pulse transmitted through transmission line 56 has a velocity $$v=\frac{c}{\sqrt{\epsilon_r}}$$

$v$ is the pulse velocity; $c$ is the velocity of light; $\epsilon_r$ is the relative dielectric constant of transmission line 56. Assuming a relative dielectric constant of 90, the velocity of the pulse through the transmission line is 3.16 centimeters per nanosecond.

If transmission line 56 is 31.6 centimeters long, the time of travel for the high voltage pulse is 10 nanoseconds. For the ten-bit word as shown in FIGURE 1, this would give a conversion rate equal to 1 nanosecond per bit.

The width $w$ and the thickness $h$ are important in determining the characteristic impedance of the transmission line. The characteristic impedance $Z_0$ is defined by the equation $$Z_0=377h/w\frac{1}{\sqrt{\epsilon_r}}$$

Assuming that a characteristic impedance of 50 ohms is desired, $Z_0=50$ ohms$=377/9.5\times h/w$. $h/w=1.26$. Assuming a thickness $h=2$ millimeters, $$w=h/1.26=1.59 \text{ millimeters}$$

It should be understood that the width of the grounded conducting plate 60 is not critical and only need be wide enough to cover the fringing fields caused by conducting plate 58. As shown in FIGURE 3, electrode 60 may cover the entire face of transmission line 56.

As mentioned above, assuming that transmission line 56 is 31.6 centimeters long and that the transmission line is used, as shown in FIGURE 1, to convert a ten-digit word, each section of the transmission line would be 3.16 centimeters in length. If a high voltage pulse generated by pulse generator 106 is 0.5 nanoseconds in length, and the velocity, as described above, is 3.16 centimeters per nanosecond, then the pulse will occupy 1.58 centimeters of the transmission line at any one instant. 1.58 centimeters would be equal to half of a segment of the transmission line. Areas 1.58 centimeters wide between segments of the transmission line can be made opaque (painted) so that the output pulses will be separated in time by 0.5 nanoseconds.

FIGURE 2 shows the result of the conversion process when the above assumptions are made. $T_0$ represents the time at which pulse generator 106 is triggered. Numbers 1, 2, 3, 4, 5, 6, 7, 8, 9 and 10 represent the time scale in nanoseconds. The serial pulse output would be a serial binary word 0111001101. It can be seen that this word is the inverse serial form of the parallel word stored in register 12 of FIGURE 1.

Figures 4, 5:
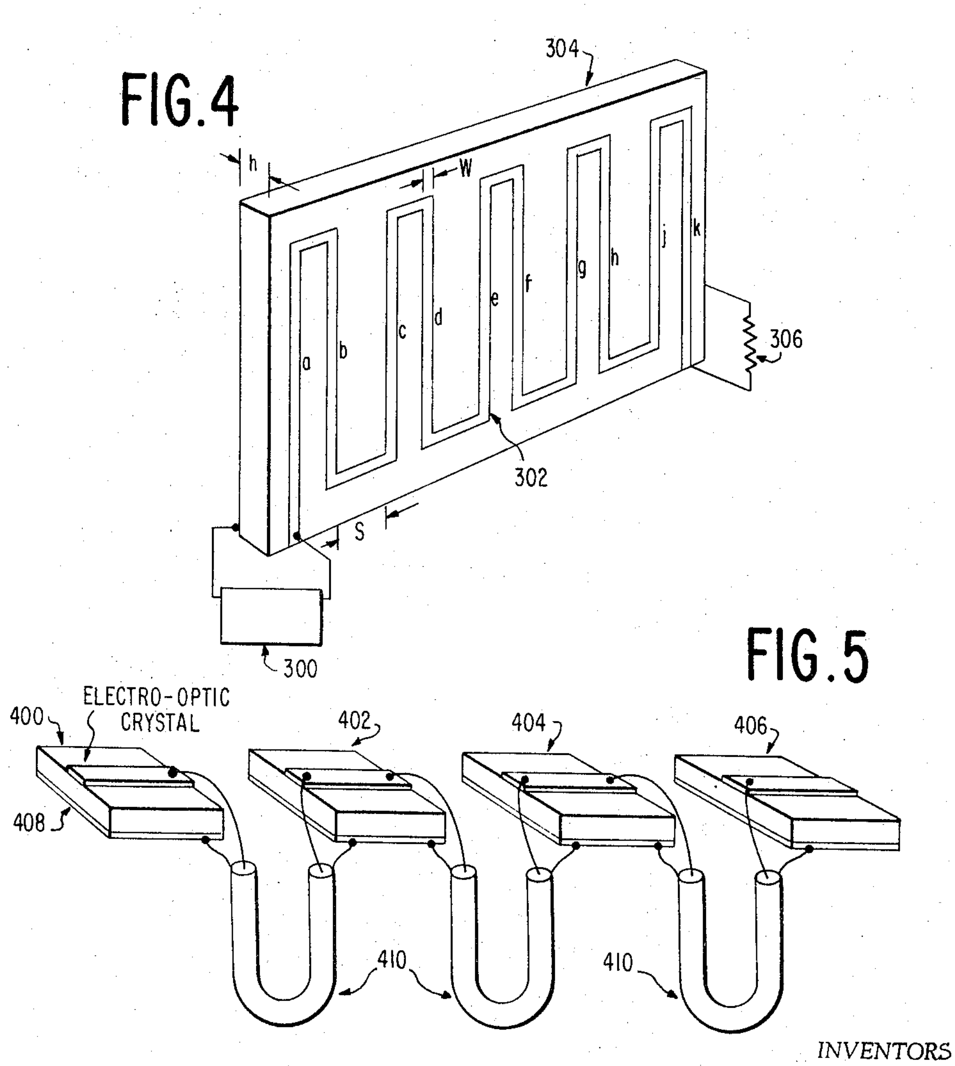
FIGURE 4 is a perspective view of a plurality of combined electro-optical transmission lines.
FIGURE 5 is a perspective view of a segmented electro-optical transmission line.

In FIGURE 4 there is shown a variation of the electro-optical transmission line for use in the parallel-to-serial converter or serial-to-parallel converter. Electro-optical transmission line 304 is of the same type of material as electro-optical transmission lines 56 and 156 of FIGURE 1. Placed on the transmission line face is a semi-transparent electrode 302. The ground electrode, not shown, is placed on the back face of electro-optical transmission line 304. A high voltage pulse source 300 is connected as shown to conducting plate 302 and the grounded conducting plate not shown. The transmission line is terminated by a characteristic impedance 306. The thickness of the electro-optical transmission line is $h$ and the width of the conducting electrode 302 is $w$. In essence, each section of the conducting plate "$a$" through "$k$" is effective to operate as one individual electro-optical transmission line. Together, the sections act as ten serially connected electro-optical transmission lines. For example, the pulse would travel up plate "$a$" and across to plate "$b$," down plate "$b$," across to plate "$c$," etc. By way of example, each section "$a$" through "$k$" may be able to convert ten bits and thus the entire electro-optical transmission line shown in FIGURE 4 would be able to convert one hundred bits of data. The distance $s$ between the sections of the conducting electrode 302 must be large enough to prevent interfering cross talk.

The electro-optical transmission lines used in the invention need not be composed of a single crystal as shown in FIGURES 1 and 4, but may be physically segmented as shown in FIGURE 5. In FIGURE 5 there are shown four electro-optical transmission lines 400, 402, 404 and 406. These transmission lines are electrically connected by cables 410. Each transmission line has placed thereon electrodes 408.

While the preferred embodiments of the invention and the best mode of operation thereof have been described, it will be apparent to those skilled in the art that the novel principles of the invention disclosed herein in connection with specific exemplifications thereof will suggest various other modifications and applications of the same. It is accordingly desired that in construing the breadth of the appended claims, they shall not be limited to the specific exemplifications of the invention described above.

We claim:

1. An optical converter for converting parallel information to serial information comprising:
- (a) an electro-optical transmission line,
- (b) means for directing polarized light beams in parallel arrangement onto selected portions of said transmission line,
- (c) means for causing said transmission line to sequentially rotate the planes of polarization of said light beams, and
- (d) means operable to convert the rotated light beams into electrical pulses.

2. An optical converter as claimed in claim 1 wherein said means for directing comprises:
- (a) an input means for storing a word in parallel form, said word being a combination of digits having assigned values of one or zero, and
- (b) a plurality of light emitting means responsive to similar digits of said word for emitting light onto respective portions of said electro-optical transmission line.

3. An optical converter as claimed in claim 2 wherein said means for directing further comprises an optical means positioned between said plurality of light emitting means and said electro-optical transmission line for polarizing the light beams passing therethrough.

4. An optical converter as claimed in claim 1 wherein said means for causing said transmission line to sequentially rotate the planes of polarization of said light beams comprises:
- (a) transparent electrically conductive plates attached to said electro-optical transmission line,

- (b) means for generating a high voltage electrical pulse, and
- (c) means for connecting said pulse generating means to a local area on said conductive plates.

5. An optical converter as claimed in claim 1 wherein said means operable to convert the rotated light beams comprises:
- (a) a photodetector, and
- (b) an optical means positioned between said electro-optical transmission line and said photodetector for passing light beams having their planes of polarization rotated by said electro-optical transmission line.

6. An optical converter for converting parallel information to serial information comprising:
- (a) an electro-optical transmission line,
- (b) a register for storing a binary word therein,
- (c) a plurality of light emitting means operable when energized to direct light onto selected areas of said electro-optical transmission line,
- (d) means for energizing said light emitting means in accordance with the word stored in said register,
- (e) means positioned between said plurality of light emitting means and said electro-optical transmission line for polarizing light passing therethrough,
- (f) means operable to transmit energy down said electro-optical transmission line for causing said electro-optical transmission line sequentially to rotate the plane of polarization of the light directed onto said selected areas,
- (g) a photodetecting means, and
- (h) means for passing to said photodetecting means light beams which have been rotated by said electro-optical transmission means.

7. An apparatus for accepting binary information in parallel from a memory register and transmitting it serially to a point of use comprising, in combination:
- (a) an electro-optical transmission line,
- (b) a plurality of light emitting diodes operating when pulsed to direct light against different areas of said transmission line,
- (c) means for pulsing said diodes in accordance with information stored in said register,
- (d) means for linearly polarizing light from said diodes,
- (e) an analyzer for normally blocking light passing through said transmission line from said diodes, and
- (f) means for directing a voltage pulse through said transmission line whereby the polarization of the light rays from said diodes are rotated serially to pass through said analyzer.

8. An optical converter for converting serial information to parallel information comprising:
- (a) an electro-optical transmission line,
- (b) means operable when energized by said serial information for directing light onto said electro-optical transmission line,
- (c) means positioned between said means for focusing light and said electro-optical transmission line for polarizing light which passes therethrough,
- (d) means for directing a voltage pulse through said electro-optical transmission line for sequentially rotating the plane of polarization of light focused onto said selected areas,
- (e) means for receiving light having been rotated by said electro-optical transmission line.

9. An optical converter as claimed in claim 8 further comprising:
- (a) an output register connected to said means for receiving.

10. An optical converter as claimed in claim 8 wherein said means for receiving comprises:
- (a) a plurality of photodetectors, and
- (b) an analyzer, positioned between said electro-optical transmission line and said plurality of photodetectors for passing light rotated by said electro-optical transmission line to selected ones of said plurality of photodetectors.

11. An optical converter as claimed in claim 8 wherein said means for directing comprises:

(a) a high voltage pulse generator,
(b) a pair of transparent conducting plates attached to said electro-optical transmission line, and
(c) means for connecting said high voltage pulse generator to said transparent conducting plates.

12. An optical converter for converting serial information to parallel information comprising:

(a) an electro-optical transmission line,
(b) means for receiving said serial information having digits with assigned values of ones and zeros,
(c) a light emitting diode operable when pulsed to produce light beams,
(d) means connected to said receiving means and said light emitting diode for pulsing said light emitting diode in accordance with similar digits of said serial information,
(e) means for polarizing light passing therethrough,
(f) analyzing means for normally blocking light passing through said polarizer,
(g) a lens for directing light from said light emitting diode through said polarizer to illuminate said electro-optical transmission line,
(h) means for causing said electro-optical transmission line to rotate the plane of polarization of the light illuminating selected areas thereof so as to enable the light to pass through said analyzer,
(i) a plurality of photodetectors positioned to selectively receive light passing through different areas of said analyzer, and
(j) means connected to said plurality of photodetectors for storing said serial information in parallel form.

13. A high-speed data transmission system for transferring parallel data from a first location to a second location comprising: optical means at said first location for converting parallel information to serial information, means at said first location responsive to said optical means at said first location for transmitting said serial information in the form of light pulses to said second location, optical means at said second location for converting serial information to parallel information, and means at said second location for detecting said serial information light pulses transmitted from said first location and for transferring said pulses to said optical means at said second location, wherein said optical means at said first location comprises;

(a) an electro-optical transmission line,
(b) means for directing polarized light beams in parallel arrangement onto selected portions of said electro-optical transmission line, and
(c) means for causing said transmission line to sequentially rotate the plane of polarization of said light beams.

14. The system as claimed in claim 13 wherein said means for directing comprises:

(a) an input means for storing a word in parallel form, said word being a combination of digits having assigned values of one or zero, and
(b) a plurality of light emitting means responsive to similar digits of said word for emitting light onto respective portions of said electro-optical transmission line.

15. The system as claimed in claim 14 wherein said means for directing further comprises an optical means positioned between said plurality of light emitting means and said electro-optical transmission line for polarizing the light beams passing therethrough.

16. The system as claimed in claim 13 wherein said means for causing said transmission line to sequentially rotate the planes of polarization of said light beams comprises:

(a) transparent electrically conductive plates attached to said electro-optical transmission line,
(b) means for generating a high voltage electrical pulse, and
(c) means for connecting said pulse generating means to said conductive plates.

17. A high-speed data transmission system for transferring parallel data from a first location to a second location comprising: optical means at said first location for converting parallel information to serial information, means at said first location responsive to said optical means at said first location for transmitting said serial information in the form of light pulses to said second location, optical means at said second location for converting serial information to parallel information, and means at said second location for detecting said serial information light pulses transmitted from said first location and for transferring said pulses to said optical means at said second location, wherein said optical means at said first location comprises;

(a) an electro-optical transmission line,
(b) a register for storing a binary word therein,
(c) a plurality of light emitting means operable when energized to direct light onto selected areas of said electro-optical transmission line,
(d) means for energizing said light emitting means in accordance with the word stored in said register,
(e) means positioned between said plurality of light emitting means and said electro-optical transmission line for polarizing light passing therethrough,
(f) means operable to transmit energy down said electro-optical transmission line for causing said electro-optical transmission line sequentially to rotate the plane of polarization of the light directed onto said selected areas,
(g) a photodetecting means, and
(h) means for passing to said photodetecting means light beams which have been rotated by said electro-optical transmission means.

18. A system as claimed in claim 17 wherein said second location comprises:

(a) an electro-optical transmission line,
(b) means for receiving said serial information having digits with assigned values of ones and zeros,
(c) a light emitting diode operable when pulsed to produce light beams,
(d) means connected to said receiving means and said light emitting diode for pulsing said light emitting diode in accordance with similar digits of said serial information,
(e) means for polarizing light passing therethrough,
(f) analyzer means for normally blocking light passing through said polarizer,
(g) a lens for directing light from said light emitting diode through said polarizer to illuminate said electro-optical transmission line,
(h) means for causing said electro-optical transmission line to rotate the plane of polarization of the light illuminating selected areas thereof so as to enable the light to pass through said analyzer,
(i) a plurality of photodetectors positioned to selectively receive light passing through said analyzer, and,
(j) means connected to said plurality of photodetectors for storing detected information in parallel form.

19. A system as claimed in claim 18 further comprising a means for synchronizing the operation of said optical means at said second location with said optical means at said first location.

20. A high-speed data transmission system for transferring parallel data from a first location to a second location comprising: optical means at said first location for converting parallel information to serial information, means at said first location responsive to said optical means at said first location for transmitting said serial information in the form of light pulses to said second location, optical means at said second location for converting serial information to parallel information, and means at said second location for detecting said serial information light pulses transmitted from said first location and for transferring said pulses to said optical means at said second location, wherein said optical means at said second location comprises;

(a) an electro-optical transmission line,
(b) means operable when energized by said serial information for directing light onto said electro-optical transmission line,
(c) means positioned between said means for directing light and said electro-optical transmission line, for polarizing light which passes therethrough,
(d) means for directing a high voltage pulse through said electro-optical transmission line for rotating the plane of polarization of light directed onto sequentially selected areas of said electro-optical transmission line, and
(e) means for receiving light having been rotated by said electro-optical transmission line.

21. The system as claimed in claim 20 wherein said optical means at said second location further comprises an output register connected to said means for receiving light having been rotated by said electro-optical transmission line.

22. The system as claimed in claim 20 wherein said means for receiving light having been rotated by said electro-optical transmission line comprises:

(a) a plurality of photodetectors, and
(b) an analyzer, positioned between said electro-optical transmission line and said plurality of photodetectors, for passing light rotated by said electro-optical transmission line to selected ones of said plurality of photodetectors.

23. The system as claimed in claim 20 wherein said means for directing comprises:

(a) a high voltage pulse generator,
(b) a pair of transparent conducting plates attached to said electro-optical transmission line, and
(c) means for connecting said high voltage pulse generator to said transparent conducting plates.

References Cited

UNITED STATES PATENTS

| | | | |
|---|---|---|---|
| 2,651,715 | 9/1953 | Hines | 250—199 |
| 3,027,806 | 4/1962 | Koelsch | 250—199 |
| 3,134,840 | 5/1964 | Gamo | 250—199 |
| 3,164,665 | 1/1965 | Stello | 250—199 |
| 3,243,592 | 3/1966 | Kizo | 250—199 |
| 3,256,443 | 6/1966 | Moore | 250—199 |
| 3,264,611 | 8/1966 | Lohmann | 250—199 |

DARYL W. COOK, *Acting Primary Examiner.*

MAYNARD R. WILBUR, W. I. KOPACZ, *Examiners.*